United States Patent
Huang et al.

(10) Patent No.: US 11,337,044 B2
(45) Date of Patent: *May 17, 2022

(54) METHOD AND DEVICE FOR COMMUNICATING MESSAGES VIA A 5G NETWORK

(71) Applicant: Verizon Patent and Licensing Inc., Arlington, VA (US)

(72) Inventors: Ye Huang, San Ramon, CA (US); Kalyani Bogineni, Hillsborough, NJ (US); Sudhakar Reddy Patil, Flower Mound, TX (US); Miguel A. Carames, Argyle, TX (US); Imtiyaz Shaikh, Irving, TX (US); Jeremy Nacer, Denville, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 2 days.

This patent is subject to a terminal disclaimer.

(21) Appl. No.: 16/777,041

(22) Filed: Jan. 30, 2020

(65) Prior Publication Data

US 2020/0204964 A1 Jun. 25, 2020

Related U.S. Application Data

(63) Continuation of application No. 16/228,180, filed on Dec. 20, 2018, now Pat. No. 10,582,349.

(51) Int. Cl.
*H04W 4/18* (2009.01)
*H04W 4/14* (2009.01)
*H04L 51/234* (2022.01)

(52) U.S. Cl.
CPC .............. *H04W 4/18* (2013.01); *H04L 51/34* (2013.01); *H04W 4/14* (2013.01)

(58) Field of Classification Search
CPC ............ H04W 4/18; H04W 4/14; H04L 51/34
See application file for complete search history.

(56) References Cited

U.S. PATENT DOCUMENTS

| | | |
|---|---|---|
| 8,755,404 B2 | 6/2014 | Viswanathan et al. |
| 2002/0087704 A1 | 7/2002 | Chesnais |
| 2002/0159476 A1 | 10/2002 | Daly et al. |
| 2003/0187930 A1 | 10/2003 | Ghaffar et al. |
| 2004/0181550 A1 | 9/2004 | Warsta |
| 2007/0191035 A1 | 8/2007 | Huggett |
| 2008/0005227 A1 | 1/2008 | Subbian |
| 2008/0243619 A1 | 10/2008 | Sharman et al. |

(Continued)

*Primary Examiner* — Mazda Sabouri

(57) ABSTRACT

A device obtains a list of a plurality of user devices from a first network device and receives a message intended for a destination user device from a second network device. The device obtains information indicating that the destination user device can receive messages that conform to a particular format from a third network device and converts the message to the particular format. The device determines a reachability of the destination user device based on the list of the plurality of user devices, after converting the message, and sends the message to the destination user device via the first network device based on the reachability. The device receives a delivery message from the destination user device and sends a notification message indicating successful delivery of the message to the second network device based on the delivery message.

20 Claims, 10 Drawing Sheets

(56) References Cited

U.S. PATENT DOCUMENTS

| | | |
|---|---|---|
| 2012/0072529 A1 | 3/2012 | Ahopelto |
| 2012/0094637 A1 | 4/2012 | Jeyaseelan et al. |
| 2013/0080553 A1 | 3/2013 | Rosen et al. |
| 2013/0142119 A1* | 6/2013 | Wong .................. H04L 5/0094 370/328 |
| 2016/0174219 A1 | 6/2016 | Patil et al. |
| 2016/0269164 A1* | 9/2016 | Jiang .................... H04L 5/0055 |
| 2017/0331588 A1 | 11/2017 | Anyuru et al. |
| 2018/0279115 A1 | 9/2018 | Tanna |
| 2018/0324671 A1 | 11/2018 | Palnati et al. |
| 2018/0343601 A1 | 11/2018 | Livanos |
| 2019/0053104 A1* | 2/2019 | Qiao ....................... H04L 47/20 |
| 2019/0159238 A1* | 5/2019 | Kim ...................... H04L 5/0055 |
| 2019/0394712 A1 | 12/2019 | Ronneke |
| 2020/0053686 A1 | 2/2020 | Edge et al. |

* cited by examiner

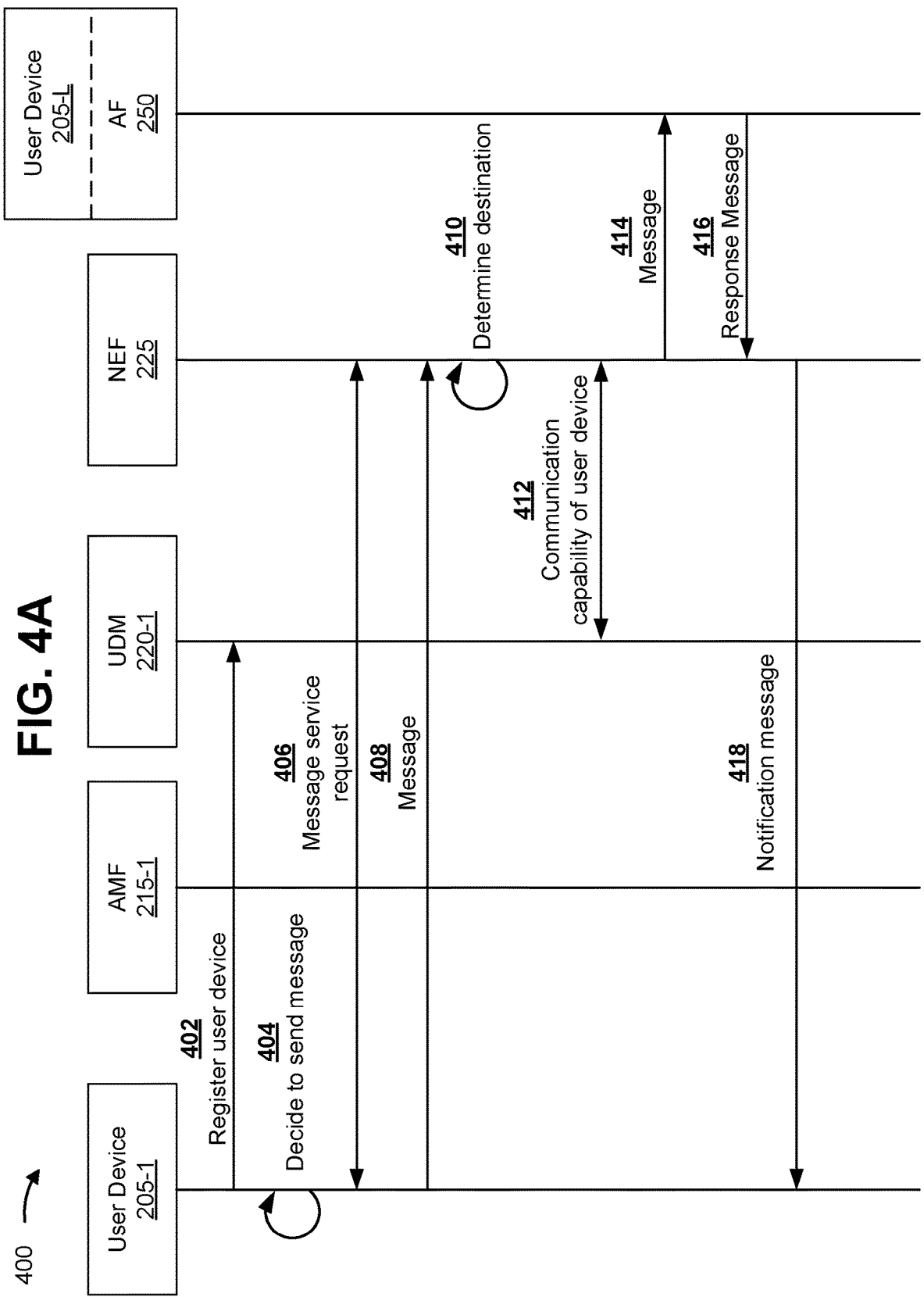

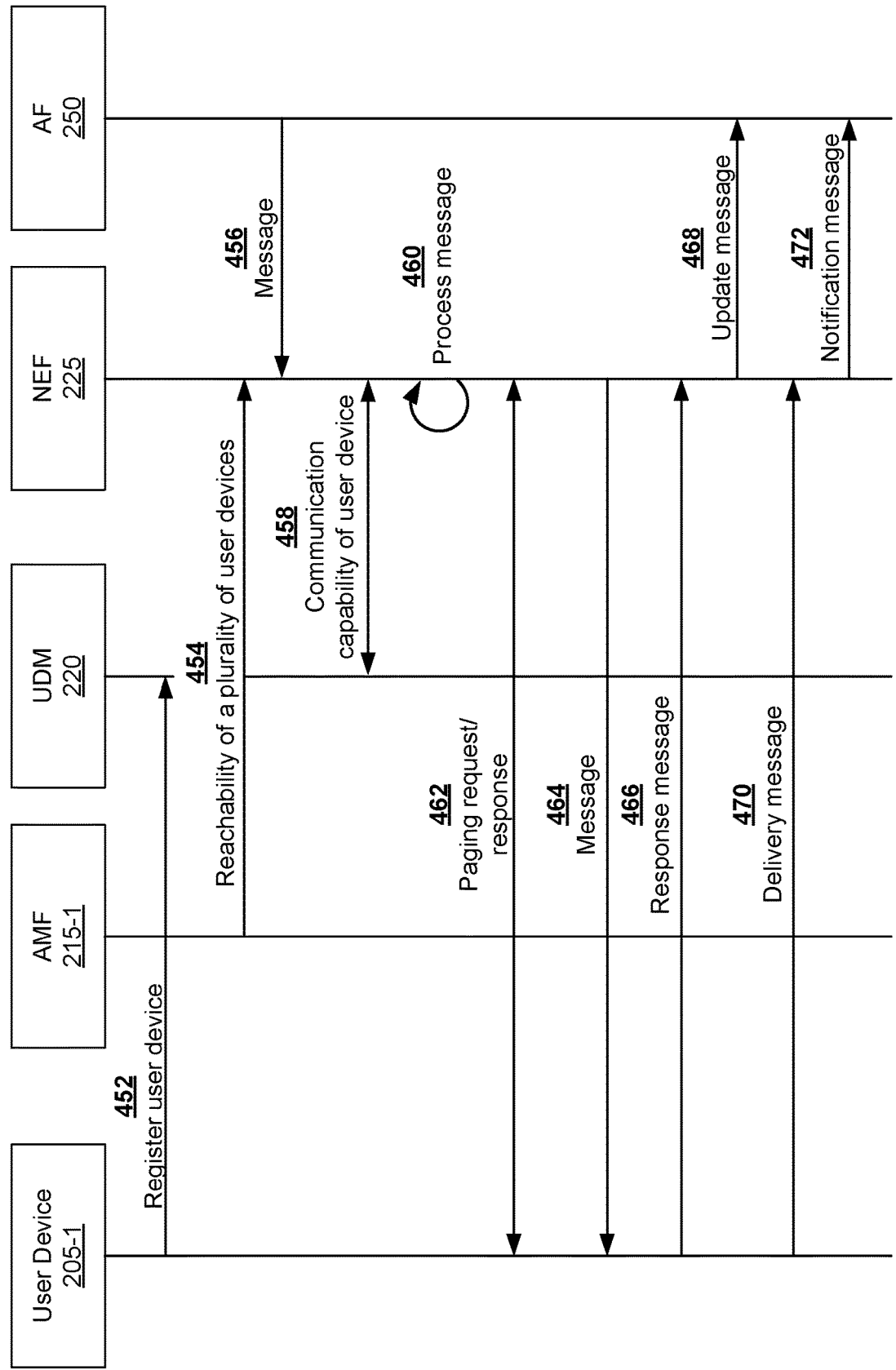

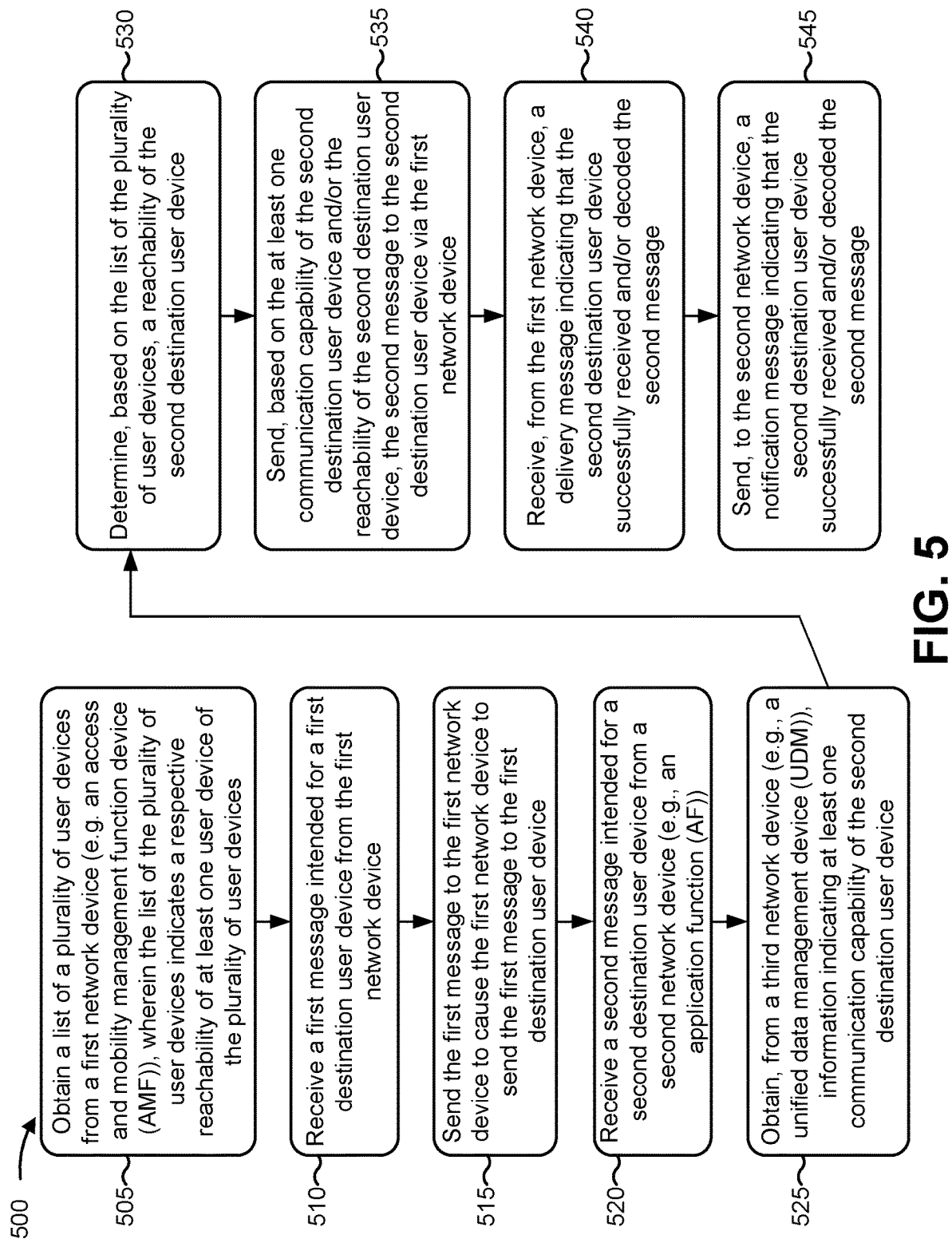

METHOD AND DEVICE FOR COMMUNICATING MESSAGES VIA A 5G NETWORK

RELATED APPLICATION

This application is a continuation of U.S. patent application Ser. No. 16/228,180, filed Dec. 20, 2018, which is incorporated herein by reference.

BACKGROUND

Short message service (SMS) is commonly known as text messaging. An SMS message may be sent from one user device to another user device via one or more wireless telecommunications systems, such as a long term evolution (LTE) wireless telecommunications system, a 3G wireless telecommunications system, a 4G wireless telecommunications system, an LTE-Advanced (LTE-A) wireless telecommunications system, a 5G wireless telecommunications system, and/or the like.

BRIEF DESCRIPTION OF THE DRAWINGS

FIGS. 4A-4B are diagrams of call flows of example operations capable of being performed by one or more devices of FIG. 2 and/or one or more components of one or more devices of FIG. 2.

FIG. 5 is a flow chart of an example process for a method and device for communicating messages via a 5G network.

DETAILED DESCRIPTION OF PREFERRED EMBODIMENTS

Figure 1A:
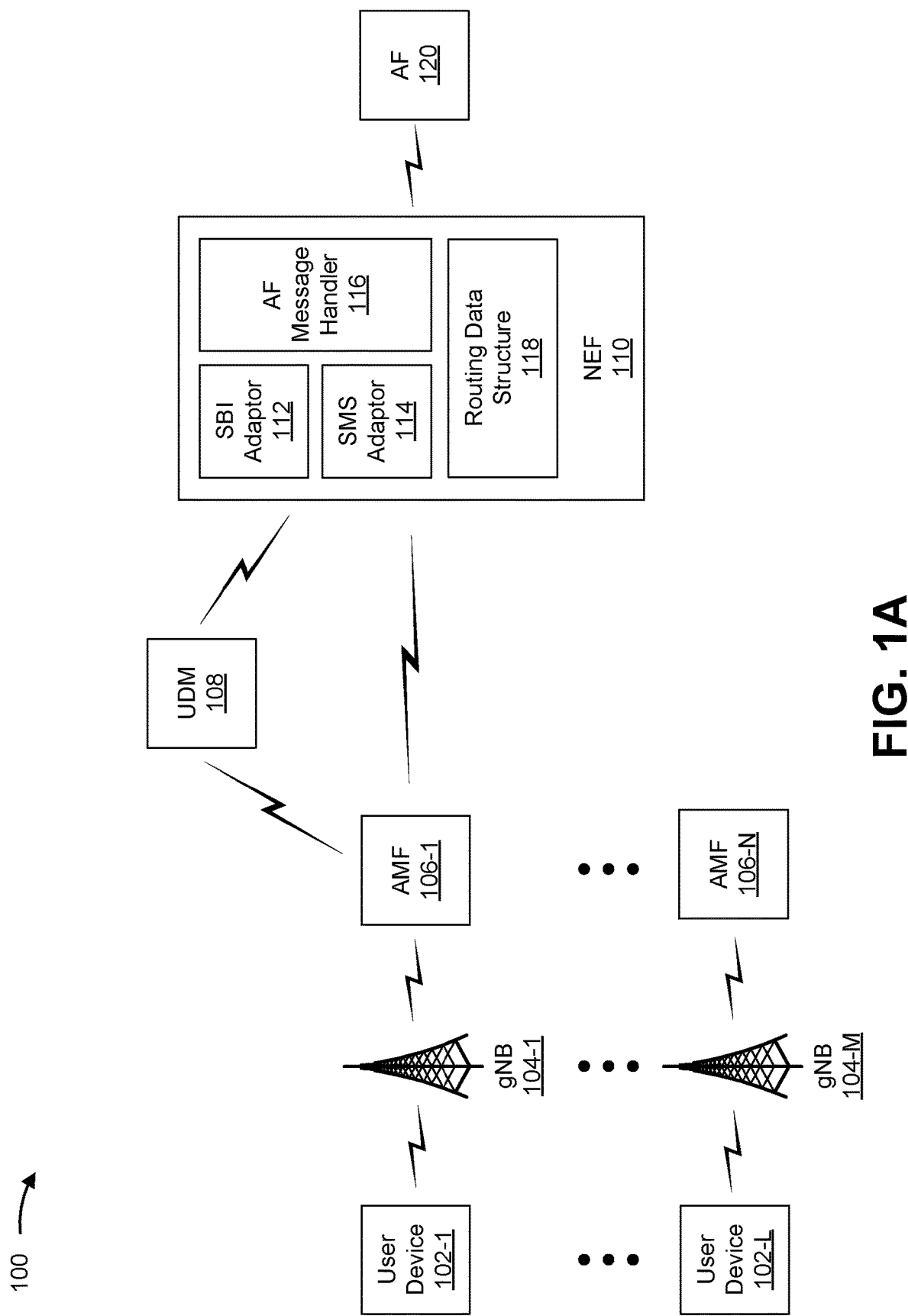
FIGS. 1A-1E are diagrams of one or more example implementations described herein.

The following detailed description of example implementations refers to the accompanying drawings. The same reference numbers in different drawings may identify the same or similar elements.

To support text messaging, a 5G telecommunications system includes a short message service (SMS) function device (SMSF) to enable SMS messages to be transmitted through the 5G telecommunications system. However, the SMSF was designed for different telecommunications systems, such as a 4G telecommunications system, and does not leverage the advanced messaging capability of the 5G telecommunications system. Further, currently sending an SMS message through a 5G telecommunications systems using the SMSF is convoluted and causes excessive status messages (at least about nine additional status messages) to be transmitted between different network devices of the 5G telecommunications system. In many cases, this increases the complexity of identifying network device issues because it is hard to determine an origination point of an SMS messaging error.

Some implementations described herein provide a network exposure device (e.g., a network exposure function (NEF)) that communicates messages, including SMS messages, via conventional 5G network devices, without using an SMSF. In some implementations, the network exposure device may receive a message intended for a destination user device and/or an application function (AF). In some implementations, where the message is intended for a destination user device, the network exposure device may determine a reachability and/or at least one communication capability of the destination user device. In some implementations, the network exposure device may process the message, based on the at least one communication capability of the destination user device, by converting the message into a format that the destination user device is capable of receiving. In some implementations, the network exposure device may send, based on the reachability of the destination user device, the message to the destination user device after converting the message. In some implementations, where the message is intended for the AF, the network exposure device may convert the message into a format that complies with an interface format used by an interface between the network exposure device and the AF. In some implementations, the network exposure device may send the message to the AF after converting the message.

In this way, some implementations provide a network exposure device that allows just standard 5G network devices to be used to communicate messages between user devices and/or AFs. There is no need for a SMSF. In turn, by removing the SMSF, messages may be more directly routed via the network devices, which may reduce the amount of status messages that need to be communicated between the network devices to send and/or receive a message. This may reduce usage of network device resources (e.g., processor resources, memory resources, communication resources, power resources, and/or the like) to communicate the messages. Furthermore, this allows numerous types of messages, not just SMS messages, to be communicated via the 5G telecommunications system in a uniform, predictable way. This may allow user devices and/or AFs to communicate messages that are optimized for 5G telecommunications, which may further reduce usage of network devices resources.

FIGS. 1A-1E are diagrams of one or more example implementations 100 described herein. Example implementation(s) 100 illustrate various portions of a wireless telecommunications systems, such as a 5G wireless telecommunications system. As shown in FIG. 1A, example implementation(s) 100 may include one or more user devices (shown as user devices 102-1 through 102-L) connected to one or more radio access networks (RANs) at one or more base stations (shown as gNB 104-1 through 104-M), such as one or more gNB base stations associated with a 5G telecommunications system. For example, a first set of user devices (e.g., one or more user devices 102-1) may be wirelessly connected with gNB 104-1 and a second set of user devices (e.g., one or more user devices 102-L) may be wirelessly connected with gNB 104-M. In some implementations, a user device of the one or more user devices may have at least one communication capability. For example, a communication capability may be a capability to send and receive messages that conform to one or more formats, such as a non-access stratum (NAS) format, a short message service (SMS) format, a service based interface (SBI) format (e.g., a format suitable for being transmitted via an SBI), a representational state transfer (REST) application programming interface (API) format, and/or the like.

As further shown in FIG. 1A, a base station of the one or more base stations may be connected to an access management network device (shown as AMF 106-1 through 106-N), such as an access and mobility management function (AMF) associated with the 5G telecommunications system. For example, gNB 104-1 may be connected to AMF 106-1 and gNB 104-M may be connected to AMF 106-N. In some implementations, an access management network device may communicate with a set of user devices, of the one or more user devices, via a base station of the one or more base stations. In some implementations, the access management network device may communicate with the set of user devices to determine, for each user device of the set of user devices, information concerning a reachability of the user device. In some implementations, the information concerning the reachability of the user device may include a reachability status of the user device (e.g., whether the user device is active, awake, asleep, idle, connected, and/or the like); a reachability time of the user device (e.g., a time when the user device is reachable, how long the user device is reachable, a reachability start time of the user device, a reachability end time of the user device, a schedule of when the user device is reachable and/or for how long, and/or the like); and/or the like. In some implementations, the access management network device may store the information concerning the reachability of the user device.

As further shown in FIG. 1A, the access management network device may be connected to a data management network device (shown as UDM 108), such as a unified data management (UDM) associated with the 5G telecommunications system. In some implementations, the data management network device may store information concerning the communication capabilities of the one or more user devices. For example, the information may include, for at least one user device of the one or more user devices, at least one communication capability of the user device.

In some implementations, the access management network device may be connected to a network exposure device (shown as NEF 110), such as a network exposure function (NEF) associated with the 5G telecommunications system. In some implementations, the network exposure device may include one or more components (shown as SBI adaptor 112, SMS adaptor 114, AF message handler 116, and routing data structure 118) for facilitating transmission of messages from and to the network exposure device, such as an SBI adaptor for facilitating transmission of SBI messages, such as REST API messages, an SMS adaptor for facilitating transmission of SMS messages, an AF message handler for facilitating transmission of messages to an application network device, a routing data structure for storing messages, and/or the like. In some implementations, the one or more components may be separate from each other and/or separate from the network exposure device (e.g., each component of the one or more components may be a separate device that may or may not be connected to the network exposure device).

In some implementations, the network exposure device may be connected to the access management network device and/or the data management network device. For example, NEF 110 may be connected to AMF 106-1, AMF 106-N, and/or UDM 108. In some implementations, the network exposure device may be connected to the access management network device and/or the data management network device via respective SBIs, REST APIs, and/or the like. In some implementations, the network exposure device may be connected to the application network device (shown as AF 120), such as an application function (AF) associated with the 5G telecommunications system. In some implementations, the network exposure device may be connected to the application network device via an SBI, a REST API, a T8 interface, and/or the like.

Figure 1B:
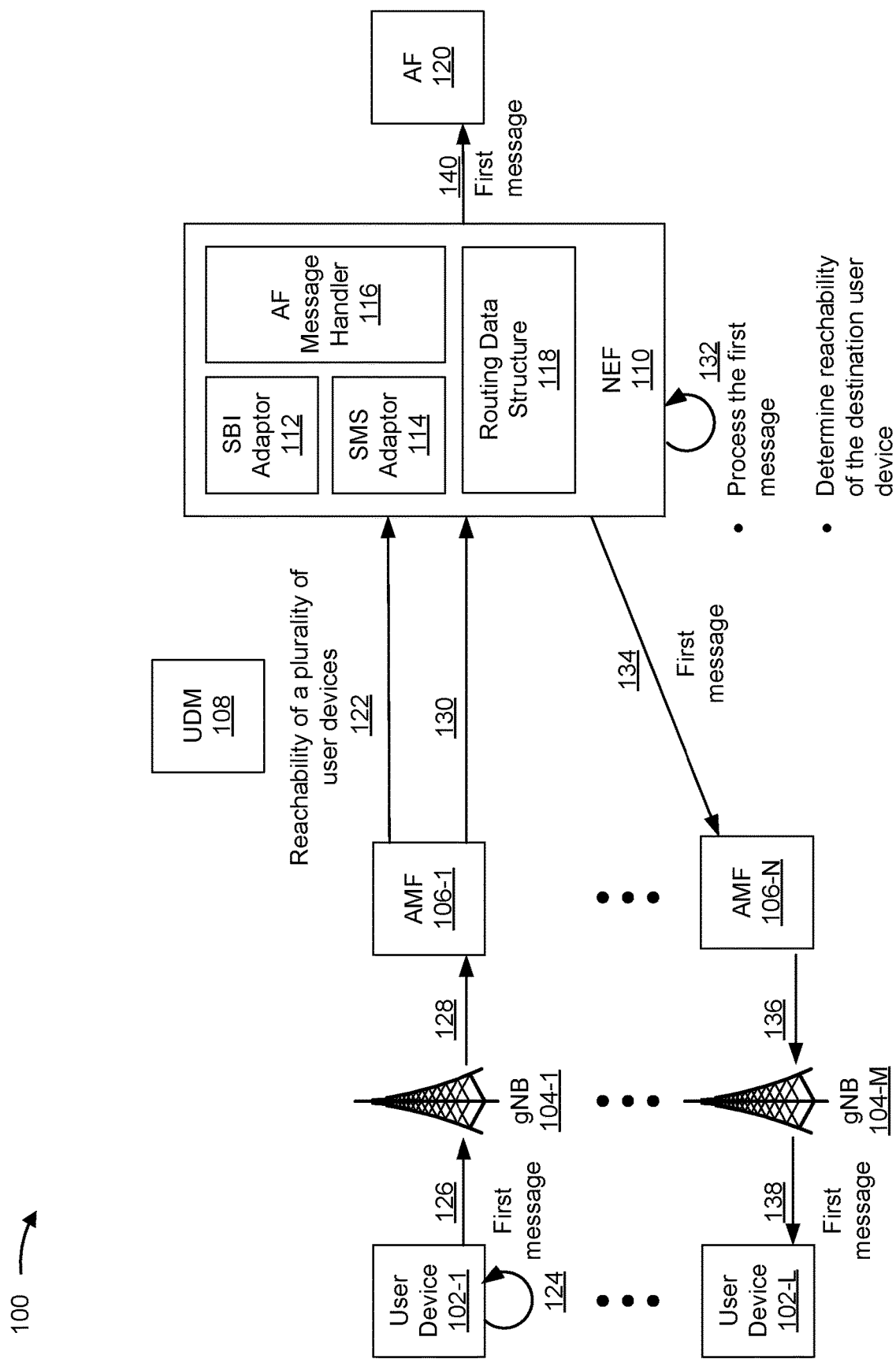

As shown in FIG. 1B and by reference number 122, the network exposure device (e.g., NEF 110) may obtain from the access management network device (e.g., AMF 106-1) a list of a plurality of user devices. In some implementations, the plurality of user devices may be associated with the one or more base stations (e.g., gNB 104-1 through gNB 104-M) and/or the one or more access management network devices (e.g., AMF 106-1 through AMF 106-N). For example, a user device of the plurality of user devices may communicates with the 5G telecommunications system via a base station, of the one or more base stations, and/or an access management network device of the one or more access management network devices. In some implementations, the list of the plurality of user devices may indicate a respective reachability of at least one user device of the plurality of user devices. For example, the list of the plurality of user devices may indicate a reachability of a user device (e.g., a reachability of user device 102-1, user device 102-L, and/or the like). In some implementations, the list of the plurality of user devices may include information concerning the reachability of the user device, such as the reachability status of the user device, the at least one time of reachability of the user device, and/or the like. In some implementations, the network exposure device may store the list of the plurality of user devices in a data structure (e.g., routing data structure 118).

As shown by reference number 124, an originating user device (e.g., user device 102-1) may generate a first message. For example, a user of the originating user device may enter information into the originating user device, via a user interface of the originating user device, to cause the user device to generate the first message. In some implementations, the first message may conform to a NAS format, an SMS format, an SBI format, a REST API format, and/or the like. For example, the first message may be an SMS transfer protocol data unit (TPDU) message, an SBI message, a REST API message, a REST API message that includes an SMS TPDU message, and/or the like. In some implementations, the first message may be intended for a destination user device (e.g., another user device other than the originating user device, such as user device 102-L). Additionally, or alternatively, the first message may be intended for the application network device (e.g., AF 120). In some implementations, the first message may include information that indicates whether the first message is intended for the destination user device, the application network device, and/or the like.

As shown by reference number 126, the originating user device may send the first message to a base station associated with the originating user device (e.g., gNB 104-1). As shown by reference number 128, the base station may receive the first message from the originating user device and may send the first message to an access management network device associated with the originating user device (e.g., AMF 106-1). As shown by reference number 130, the access management network device may receive the first message from the base station and may send the first message to the network exposure device (e.g., NEF 110). In some implementations, the access management network device may process the first message and send the first message to the network exposure device. For example, when the first message is an SMS TPDU message, the access management network device may generate a REST API message and include the SMS TPDU message in the REST API message. The access management network device may then send the REST API message that includes the first message to the network exposure device.

As shown by reference number 132, the network exposure device may receive the first message from the access management network device and may process the first message.

For example, the network exposure device may receive the first message and determine whether the first message is intended for the destination user device (e.g., user device 102-L) and/or the application network device (e.g., AF 120).

In some implementations, when the first message is intended for the destination user device, the network exposure device may determine a reachability of the destination user device. For example, the network exposure device may determine a reachability status of the destination user device, a time when the destination user device is reachable, how long the destination user device is reachable, a reachability start time of the destination user device, a reachability end time of the destination user device, a schedule of when the destination user device is reachable and/or for how long, and/or the like. In some implementations, the network exposure device may determine the reachability of the destination user device based on the list of the plurality of user devices stored in the data structure (e.g., routing data structure 118). For example, the network exposure device may search for an entry concerning the destination user device in the list of the plurality of user devices and obtain the information concerning the reachability of the destination user device.

In some implementations, the network exposure device may determine at least one time of reachability of the destination user device based on the reachability of the destination user device. In some implementations, the network exposure device may determine, based on the at least one time of reachability, that the destination user device is not reachable and may send the first message to the data structure (e.g., routing data structure 118) for storage. For example, the network exposure device may determine that the destination user device is not currently reachable (e.g., user device 102-L is asleep, inactive, and/or the like) and cause the first message to be stored in the data structure until the destination user device is reachable again. In some implementations, the network exposure device may determine, based on the at least one time of reachability, that the destination user device is reachable and obtain the first message from the data structure. For example, the network exposure device may determine that the destination user device is currently reachable (e.g., user device 102-L is awake, active, and/or the like) after a period of not being reachable, and obtain the first message from the data structure.

In some implementations, the network exposure device may determine (e.g., by searching the list of the plurality of user devices stored in the data structure) that the destination user device is not reachable and/or that the destination user device is not a valid and/or a registered user device. In some implementations, the network exposure device may send an error message to the originating user device (e.g., user device 102-1) via the access management network device (e.g., AMF 106-1) and/or the base station (e.g., gNB 104-1) associated with the originating user device.

As shown by reference number 134 the network exposure device may, after determining that the destination user device is reachable, send the first message to an access management network device associated with the destination user device (e.g., AMF 106-N). In some implementations, the network exposure device may use the one or more components of the network exposure device, such as the SBI adaptor (e.g., SBI adaptor 112) and/or the SMS adaptor (e.g., SMS adaptor 114), to send the first message. For example, when the first message is a REST API message, the network exposure device may send the first message to the access management network device using the SBI adaptor. As another example, when the first message is an SMS TPDU message, the network exposure device may send the first message to the access management network device using the SMS adaptor.

As shown by reference number 136, the access management network device (e.g., AMF 106-N) may receive the first message from the network exposure device and may send the first message to a base station associated with the destination user device (e.g., gNB 104-M). In some implementations, the access management network device may process the first message and send the first message to the base station. For example, when the first message is included in a REST API message, the access management network device may separate the first message from the REST API message and send the first message to the base station. As shown by reference number 138, the base station may send the first message to the destination user device (e.g., user device 102-L). In some implementations, the destination user device may receive the first message from the base station. In some implementations, the destination user device may send one or more messages concerning receipt of the first message to the network exposure device, the originating user device, and/or the application network device in a similar manner as described elsewhere herein (see e.g., FIGS. 1D-1E, and 4A-4B).

Additionally, or alternatively, as shown by reference number 140, the network exposure device (e.g., NEF 110) may determine that the first message is intended for the application network device (e.g., AF 120). For example, the originating user device may send the first message to the application network device to report an event experienced by the originating user device. In some implementations, the network exposure device may convert the first message to a different format before sending the first message to the application network device. In some implementations, the network exposure device may convert the first message to a format that may be sent to the application network device via the interface between the network exposure device and the application network device. For example, when the first message is an SMS TPDU message, a REST API message that includes an SMS TPDU message, and/or the like, the SMS adaptor (e.g., SMS adaptor 114) and/or the AF message handler (e.g., AF message handler 116) may process the first message to convert the first message into a T8 message (e.g., a message suitable for being transmitted via a T8 interface), a REST API message, an optimized REST API message (e.g., a REST API message where unnecessary information concerning the SMS TPDU message included in the REST API message has been removed), and/or the like.

Figure 1C:
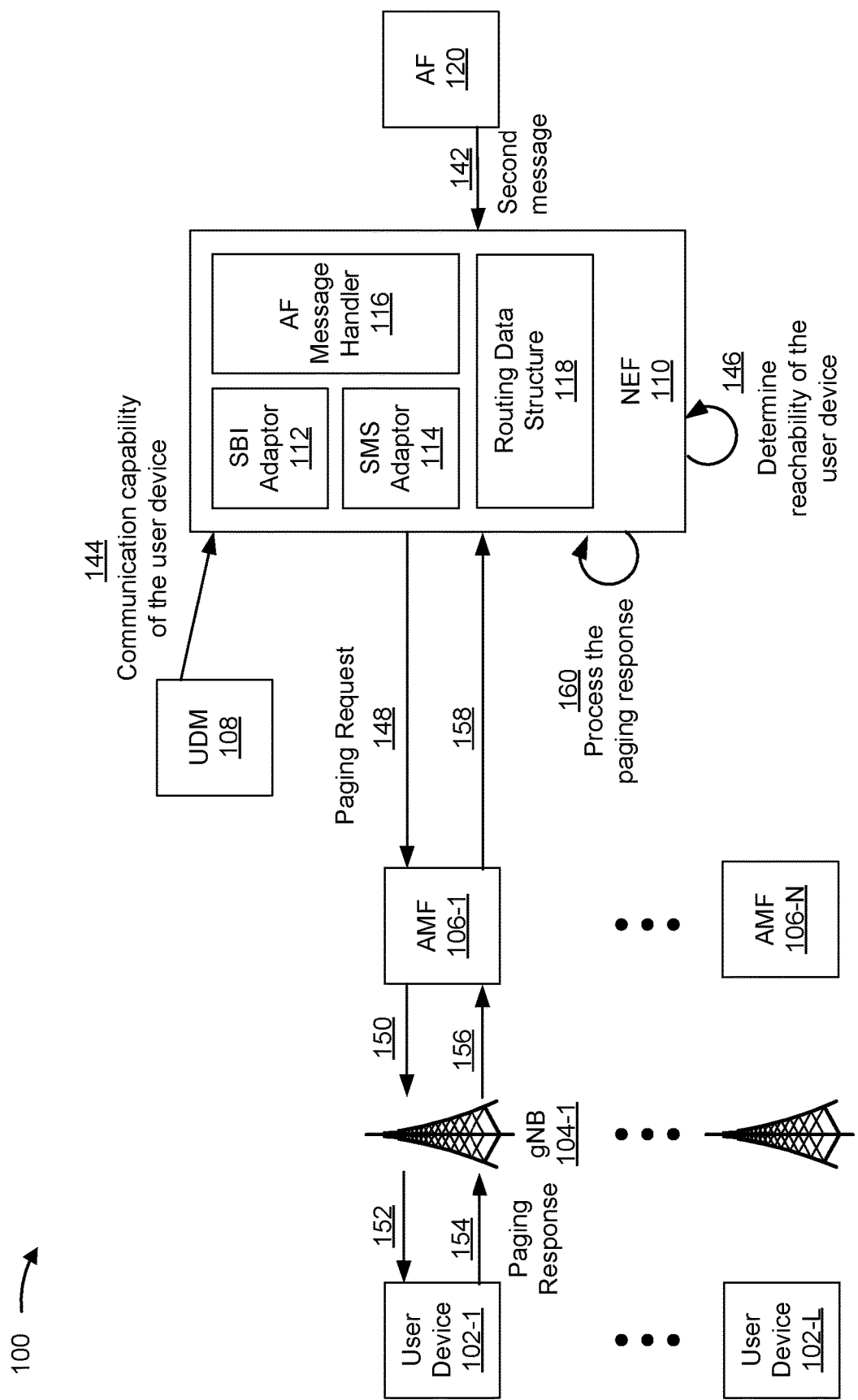

As shown in FIG. 1C and by reference number 142, the application network device (e.g., AF 120) may send a second message to the network exposure device (e.g., NEF 110). In some implementations, the second message may be intended for a destination user device (e.g., user device 102-1). In some implementations, the second message may conform to a REST API format, an SBI format, a T8 format (e.g., a format suitable for being transmitted via a T8 interface), and/or the like. For example, the second message may be a REST API message, an SBI message, a T8 message, and/or the like. In some implementations, the network exposure device may receive the second message from the application network device.

As shown by reference number 144, the network exposure device may obtain information indicating at least one communication capability of the destination user device. In some implementations, the information may indicate that the destination user device is capable of receiving messages that conform to a particular format, such as an SMS format.

In some implementations, the network exposure device may obtain the information from the data management network device (e.g., UDM 108). For example, the network exposure device may send a query to the data management network device concerning a messaging capability of the destination user device. The data management network device may process the query and determine a response that indicates that the destination user device is capable of sending and/or receiving messages that conform to the particular format. The data management network device may send the response to the network exposure device and the network exposure device may receive the response from the data management network device.

As shown by reference number 146, the network exposure device (e.g., NEF 110) may determine a reachability of the destination user device (e.g., user device 102-1) in a similar manner as described herein in relation to FIG. 1B. For example, the network exposure device may determine the reachability of the destination user device based on the list of the plurality of user devices stored in the data structure (e.g., routing data structure 118). In some implementations, the network exposure device may determine at least one time of reachability of the destination user device based on the reachability of the destination user device. In some implementations, the network exposure device may determine, based on the at least one time of reachability, that the destination user device is reachable (e.g., that user device 102-1 is awake, active, connected, and/or the like).

As shown by reference number 148, the network exposure device may generate a paging request. In some implementations, the paging request may be intended for the destination user device and may indicate that the network exposure device will send the second message to the destination user device. In some implementations, the network exposure device may send the paging request to the access management network device. In some implementations, the network exposure device may generate and/or send the paging request to the access management network device based on the reachability of the destination user device. For example, the network exposure device may generate and/or send the paging request to the access management network device when the destination user device is reachable (e.g., awake, active, connected, and/or the like) so that the access management network device may forward the paging request to the user device while the user device is reachable and able to receive the paging request.

As shown by reference number 150, the access management network device may receive the paging request and may send the paging request to the base station associated with the destination user device (e.g., gNB 104-1). As shown by reference number 152, the base station may receive the paging request and may send the paging request to the destination user device (e.g., user device 102-1).

As shown by reference number 154, the destination user device may receive the paging request and determine a paging response. In some implementations, the paging response indicates that the destination user device is ready to receive the second message. For example, the paging response may indicate that the destination user device is not communicating with any other network devices (and therefore has bandwidth to receive the second message). In some implementations, the destination user device may send the paging response to the base station (e.g., gNB 104-1). As shown by reference number 156, the base station may receive the paging response and may send the paging response to the access management network device (e.g., AMF 106-1). As shown by reference number 158, the access management network device may receive the paging response and send the paging response to the network exposure device (e.g., NEF 110).

As shown by reference number 160, the network exposure device may receive the paging response from the access management network device and process the paging response. In some implementations, the network exposure device may process the paging response to determine that the network exposure device is to send the second message to the destination user device (e.g., user device 102-1). For example, the network exposure device may determine, based on the paging response, that the destination user device is ready to receive the second message via the access management network device (e.g., AMF 106-1).

In some implementations, the network exposure device may process the second message based on determining that the network exposure device is to send the second message to the destination user device via the access management network device. In some implementations, the network exposure device may convert the second message to a different format before sending the second message to the access management network device. In some implementations, the network exposure device may convert the second message to a format that may be sent to the access management network device via the interface between the network exposure device and the access management network device. In some implementations, the network exposure device may convert, based on the information indicating that the destination user device is capable of sending and and/or receiving messages that conform to the particular format, the second message to the particular format. For example, when the second message is a REST API message, an SBI message, a T8 message, and/or the like, the SMS adaptor (e.g., SMS adaptor 114) and/or the AF message handler (e.g., AF message handler 116) may process the second message to convert the second message into an SMS TPDU message, a REST API message that includes an SMS TPDU message, and/or the like. In some implementations, the network exposure device may add the second message to a payload of a message that conforms to the particular format. For example, the SMS adaptor and/or the AF message handler may add the second message to a payload of a REST API message.

Figure 1D:
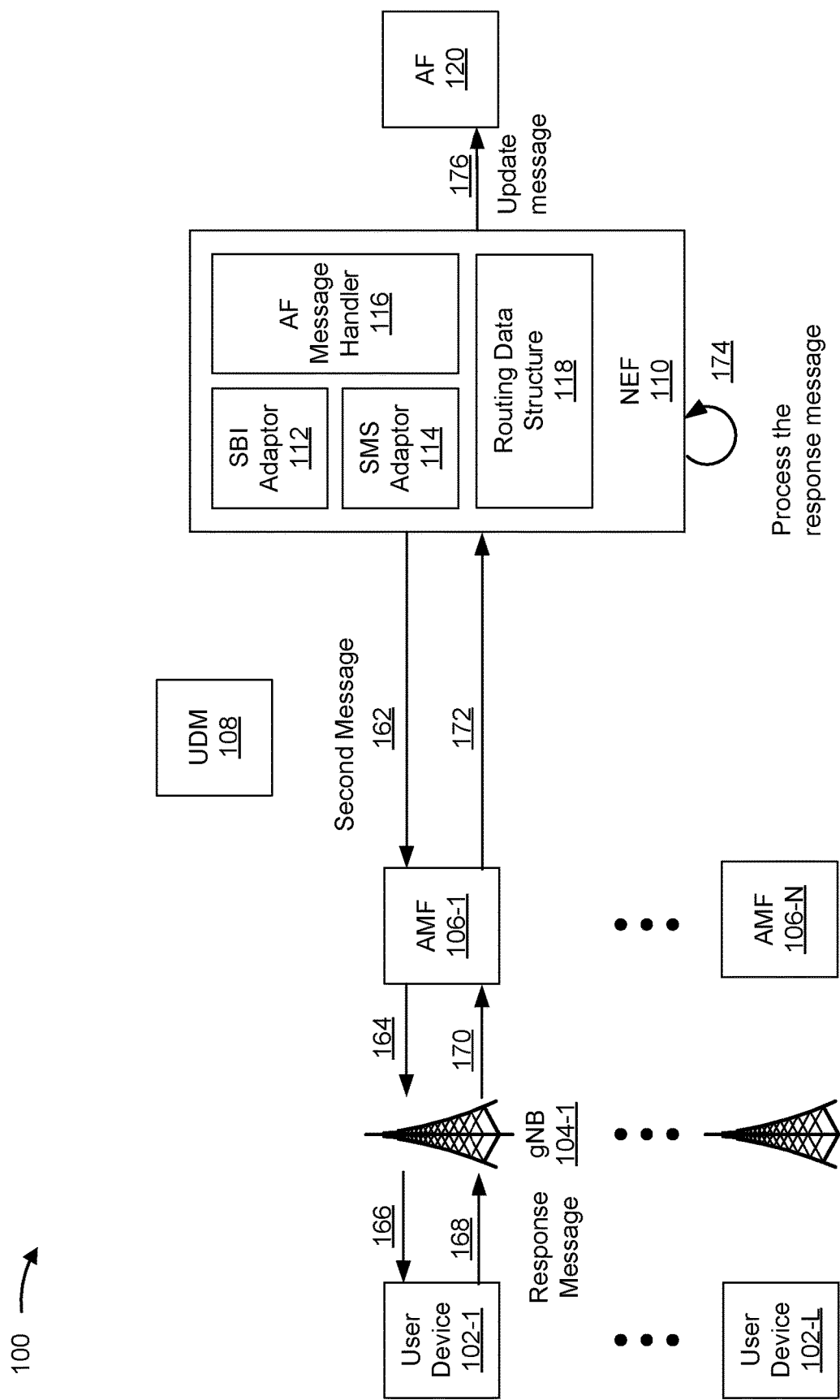

As shown in FIG. 1D and by reference number 162, the network exposure device (e.g., NEF 110) may send the second message to the access management network device associated with the destination user device (e.g., AMF 106-1). In some implementations, the network exposure device may use one or more components, such as the SBI adaptor (e.g., SBI adaptor 112) and/or the SMS adaptor (e.g., SMS adaptor 114), to send the second message. For example, when the second message is a REST API message, the network exposure device may send the second message to the access management network device using the SBI adaptor. As another example, when the first message is an SMS TPDU message, the network exposure device may send the first message to the access management network device using the SMS adaptor.

As shown by reference number 164, the access management network device may receive the second message and may send the second message to the base station associated with the destination user device (e.g., gNB 104-1). In some implementations, the access management network device may process the second message and send the second message to the base station. For example, when the second message is included in a REST API message, the access management network device may separate the second message from the REST API message and send the second message to the base station. As shown by reference number 166, the base station may receive the second message and may send the second message to the destination user device (e.g., user device 102-1).

As shown by reference number 168, the destination user device may receive the second message and may generate a response message. In some implementations, the response message may indicate that the destination user device received the second message. In some implementations, the destination user device may send the response message to the base station (e.g., gNB 104-1). As shown by reference number 170, the base station may receive the response message and may send the response message to the access management network device (e.g., AMF 106-1). As shown by reference number 172, the access management network device may receive the response message and send the response message to the network exposure device (e.g., NEF 110).

As shown by reference number 174, the network exposure device may receive the response message from the access management network device and process the response message. In some implementations, the network exposure device may determine, based on the response message, that the destination user device received the second message. As shown by reference number 176, the network exposure device may generate and send, based on the response message, an update message to the application network device (e.g., AF 120). In some implementations, the update message may indicate that the destination user device received the second message.

Figure 1E:
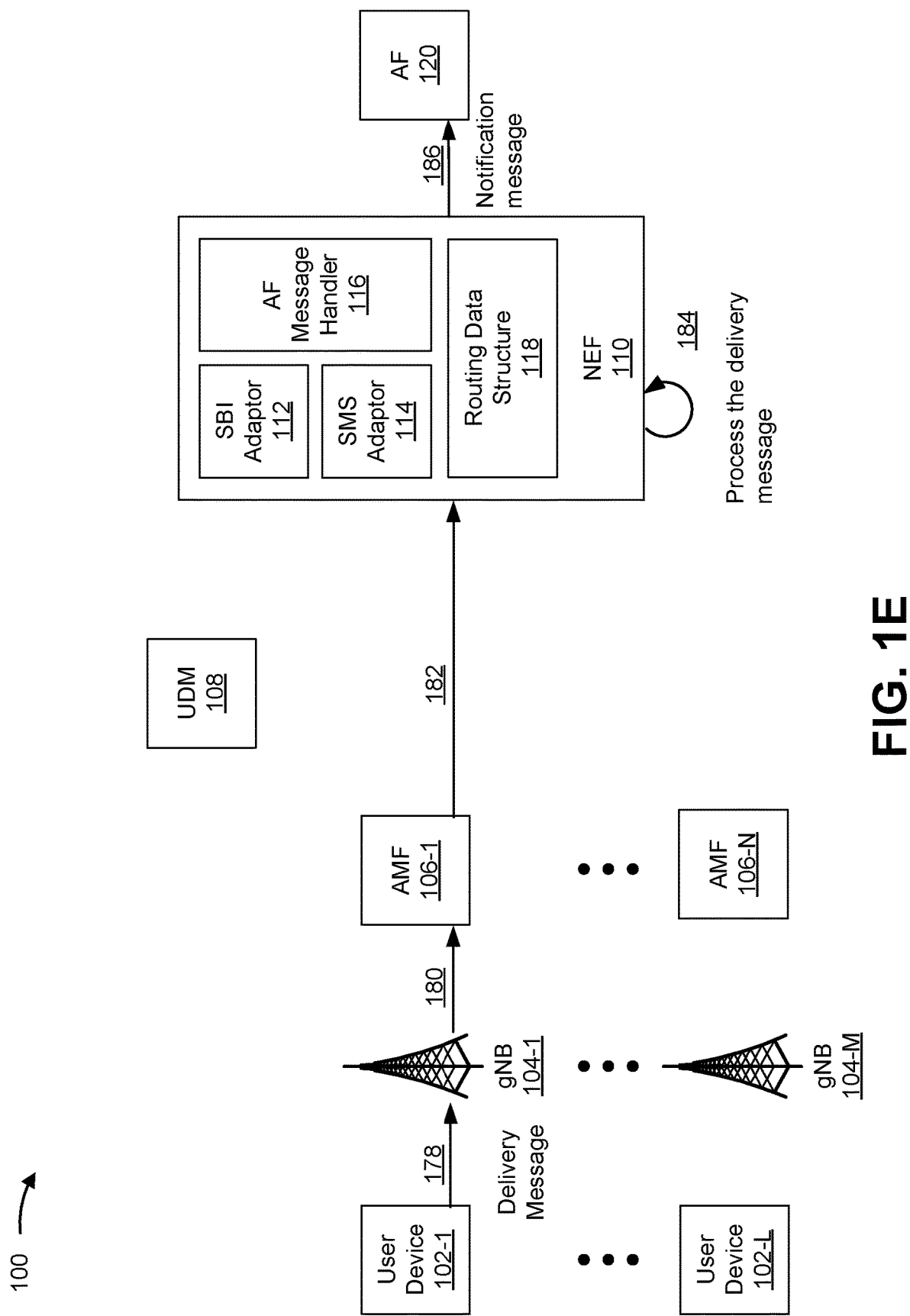

As shown in FIG. 1E and by reference number 178, the destination user device (e.g., user device 102-1) may generate a delivery message and send the delivery message to the base station (e.g., gNB 104-1). In some implementations, the delivery message indicates that the destination user device successfully received and/or decoded the second message. As shown by reference number 180, the base station may receive the delivery message and may send the delivery message to the access management network device. As shown by reference number 182, the access management network device may receive the delivery message and may send the delivery message to the network exposure device (e.g., NEF 110).

As shown by reference number 184, the network exposure device may receive the delivery message from the access management network device and process the delivery message. In some implementations, the network exposure device may determine, based on the delivery message, that the destination user device successfully received and/or decoded the second message. As shown by reference number 186, the network exposure device may generate and send, based on the delivery message, a notification message to the application network device (e.g., AF 120). In some implementations, the notification message may indicate that the destination user device successfully received and/or decoded the second message.

As indicated above, FIGS. 1A-1E are provided merely as examples. Other examples can differ from what was described with regard to FIGS. 1A-1E. Further, the number and arrangement of devices and networks shown in FIGS. 1A-1E are provided as an example. In practice, there may be additional devices and/or networks, fewer devices and/or networks, different devices and/or networks, or differently arranged devices and/or networks than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) of example implementation 100 may perform one or more functions described as being performed by another set of devices of example implementation 100.

Figure 2:
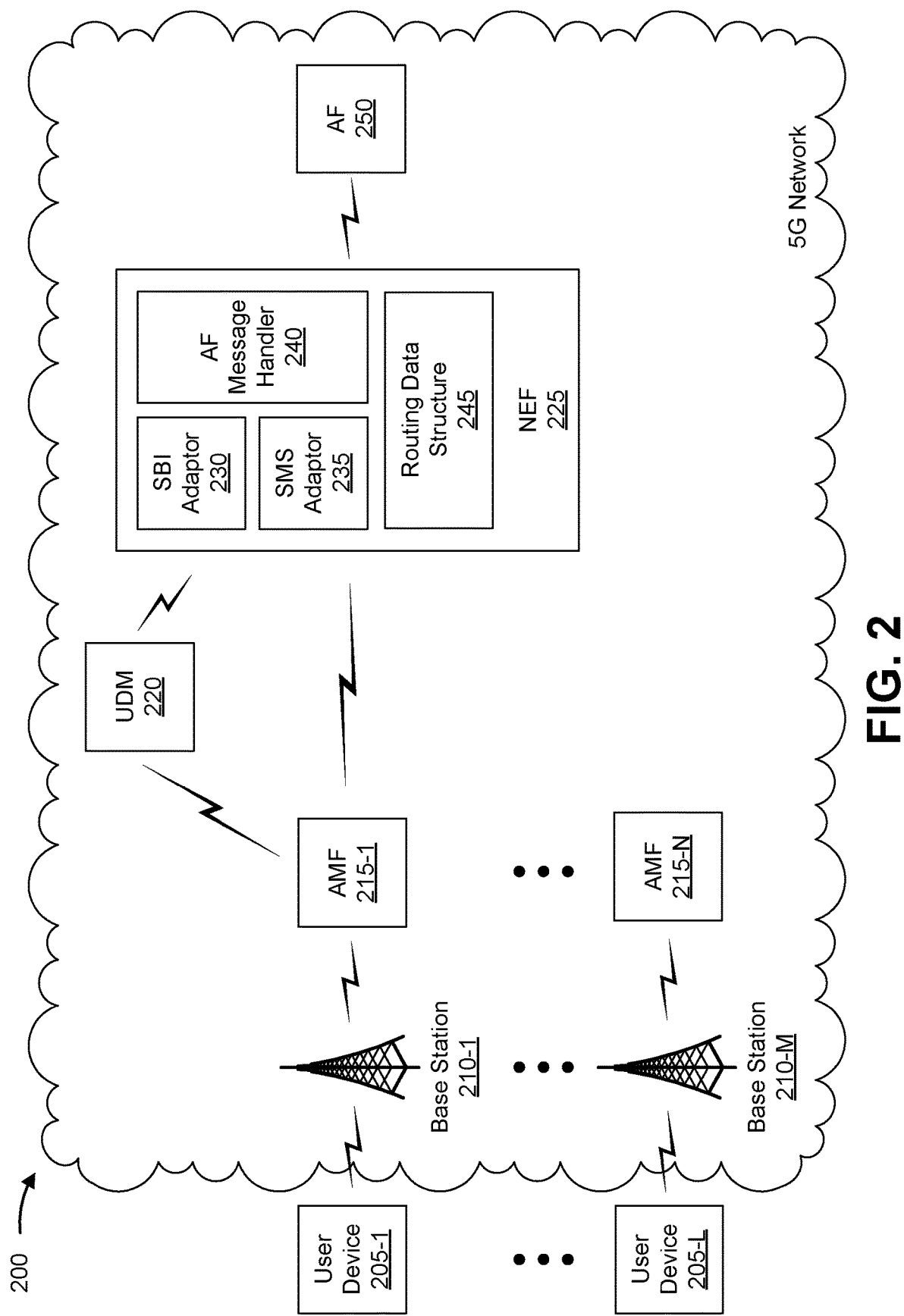
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include may include one or more user devices 205-1 through 205-L (L≥1) (hereinafter referred to collectively as "user devices 205," and individually as "user device 205"), one or more base stations 210-1 through 210-M (M≥1) (hereinafter referred to collectively as "base stations 210," and individually as "base station 210"), one or more access and mobility management functions (AMFs) 215-1 through 215-N(N≥1) (hereinafter referred to collectively as "AMFs 215," and individually as "AMF 215"), a unified data management (UDM) 220, a network exposure function (NEF) 225, a service based interface (SBI) adaptor 230, a short message service (SMS) adaptor 235, an application function (AF) message handler 240, a routing data structure 245, and an application function (AF) 250. Devices of environment 200 may interconnect via wired connections, wireless connections, or a combination of wired and wireless connections.

User device 205 includes one or more devices capable of receiving, generating, storing, processing, and/or providing information, such as information described herein. For example, user device 205 may include a communication and/or computing device, such as an Internet of Things (IoT) device (e.g., a category M1 (Cat-M1) device, a narrow band (NB) IoT device, and/or the like), a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 205 may generate information, such as a message, a paging response message, a response message, a delivery message, and/or the like, and send the information to AMF 215 via base station 210. In some implementations, the user device may receive information, such as a message, a paging request message, and/or the like, from AMF 215 via base station 210.

Base station 210 includes one or more devices capable of transferring traffic, such as audio, video, text, one or more messages, and/or other traffic, to or from user device 205 and/or AMF 215. In some implementations, base station 210 may include a small cell base station, such as a base station of a microcell, a picocell, and/or a femtocell. In some implementations, base station 210 may send traffic to and/or receive traffic from user device 205 via an air interface. In some implementations, base station 210 may include a gNB associated with a 5G network that receives traffic from and/or sends traffic to NEF 225 via AMF 215.

AMF 215 includes one or more devices, such as one or more server devices, capable of managing authentication, activation, deactivation, and/or mobility functions associated with a user device 205 connected to the 5G network. In some implementations, AMF 215 may perform operations relating to authentication of user device 205. AMF 215 may perform operations associated with handing off user device 205 from a first base station 210 to a second base station 210 when user device 205 is transitioning from a first cell associated with the first base station 210 to a second cell associated with the second base station 210. Additionally, or alternatively, AMF 215 may select another AMF (not pictured), to which user device 205 should be handed off (e.g., when user device 205 moves out of range of AMF 215). In some implementations, AMF 215 may communicate with a user device 205 (e.g., via base station 210) to obtain information concerning a reachability of user device 205 and may send the information to NEF 225. In some implementations, AMF 215 may transfer traffic, such as audio, video, text, one or more messages, and/or other traffic, to or from user device 205 (e.g., via base station 210) and/or NEF 225.

UDM 220 includes one or more devices, such as one or more server devices, capable of registering and storing profile information associated with a user device 205 connected to the 5G network. In some implementations, UDM 220 may store information concerning at least one communication capability of user device 205. In some implementations, UDM 220 may send the information concerning the at least one communication capability of user device 205 to NEF 225.

NEF 225 includes one or more devices, such as one or more server devices, capable of exposing capabilities, events, information, and/or the like in the 5G network to help other devices in the 5G discover network resources and/or utilize network resources efficiently. In some implementations, NEF 225 may receive one or more messages from and/or send one or more messages to a user device 205 via AMF 215 and base station 210, and receive messages from and/or send messages to AF 250. In some implementations, NEF may receive a message and convert the message to a different format and send the message after converting the message. In some implementations, NEF 225 may obtain a list of a plurality of user devices from AMF 215 and determine a reachability of user device 205 based on the list of the plurality of user devices. In some implementations, NEF 225 may send a paging request to user device 205 and receive a paging response from user device 205.

SBI adaptor 230 includes one or more components of NEF 225. In some implementations, SBI adaptor 230 includes one or more network devices, such as one or more server devices, capable of receiving, generating, storing, processing (e.g., converting), and/or providing messages, such as messages described herein. For example, SBI adaptor 230 may facilitate transmitting a message received from an originating user device 205 to a destination user device 205 via AMF 215.

SMS adaptor 235 includes one or more components of NEF 225. In some implementations, SMS adaptor 235 includes one or more network devices, such as one or more server devices, capable of receiving, generating, storing, processing (e.g., converting), and/or providing messages, such as messages described herein. For example, SMS adaptor 235 may facilitate transmitting a message received from an originating user device 205 to a destination user device 205 via AMF 215 and/or to AF 250. As another example, the SMS adaptor 235 may facilitate transmitting a message received from AF 250 to a destination user device 205 via AMF 215. In some implementations, the SMS adaptor 235 may facilitate converting a message of a first format to a second format.

AF message handler 240 includes one or more components of NEF 225. In some implementations, AF message handler 240 includes one or more network devices, such as one or more server devices, capable of receiving, generating, storing, processing (e.g., converting), and/or providing messages, such as messages described herein. For example, the AF message handler 240 may facilitate transmitting a message to or from AF 250.

Routing data structure 245 includes one or more components of NEF 225. In some implementations, routing data structure 245 includes one or more devices capable of receiving, generating, storing, processing, and/or providing information, such as information described herein. For example, routing data structure 245 may include a server device (e.g., a host server, a web server, an application server, etc.), a data center device, or a similar device. In some implementations, routing data structure 245 may store the list of the plurality of user devices, one or messages, and/or the like for retrieval by NEF 225.

AF 250 includes one or more devices capable of receiving, generating, storing, processing, and/or providing information, such as information described herein. For example, AF 250 may include a server device (e.g., a host server, a web server, an application server, etc.), a data center device, or a similar device. In some implementations, AF 250 may send information, such as a message, to NEF 225 and receive information, such as a message, an update message, a notification message, and/or the like from NEF 225.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
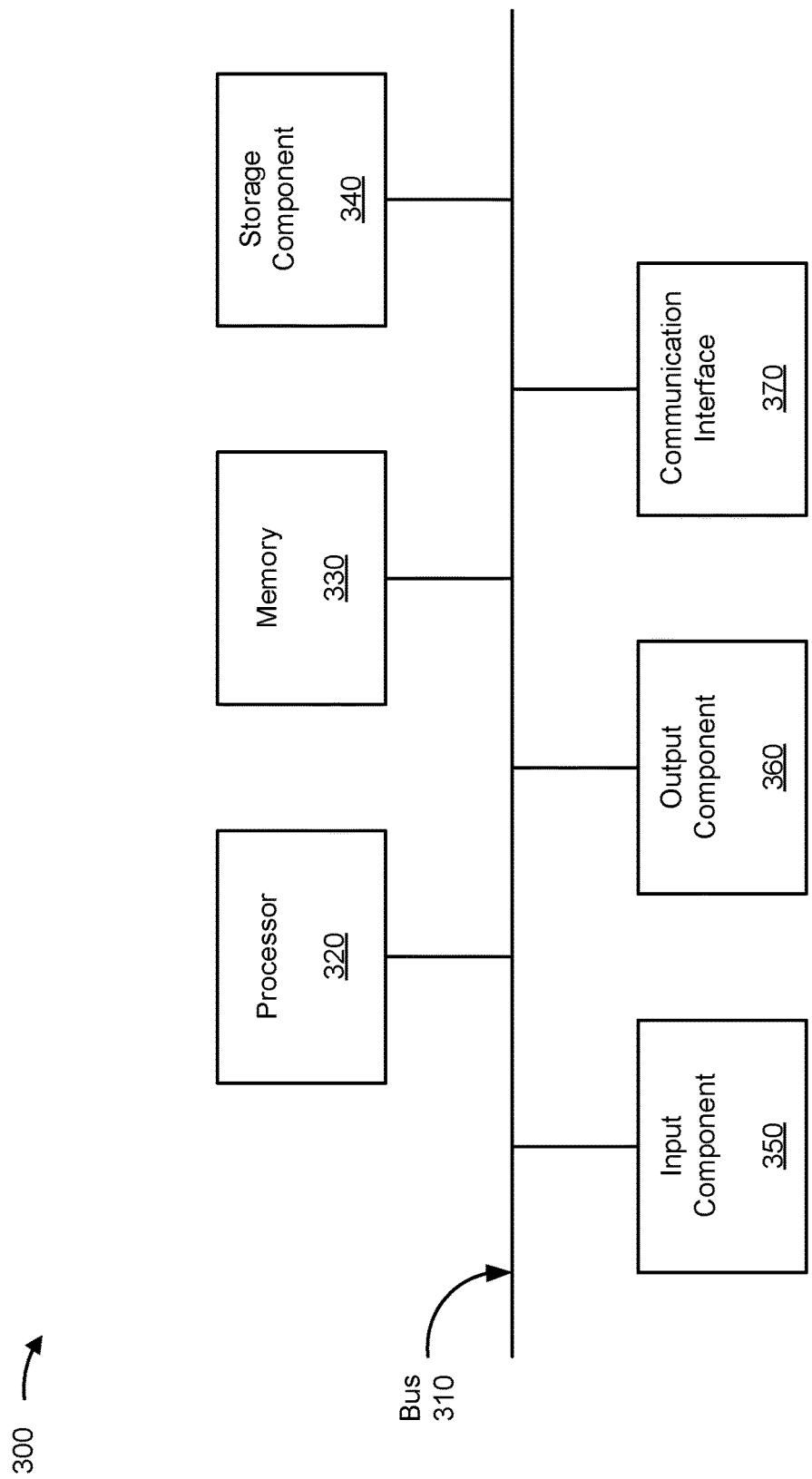
FIG. 3 is a diagram of example components of one or more devices of FIG. 2.

FIG. 3 is a diagram of example components of a device 300. Device 300 may correspond to user device 205, base station 210, AMF 215, UDM 220, NEF 225, SBI adaptor 230, SMS adaptor 235, AF message handler 240, routing data structure 245, and/or AF 250. In some implementations, user device 205, base station 210, AMF 215, UDM 220, NEF 225, SBI adaptor 230, SMS adaptor 235, AF message handler 240, routing data structure 245, and/or AF 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIGS. 4A-4B are diagrams of example call flows of example operations capable of being performed by one or more devices of FIG. 2 and/or one or more components of one or more devices of FIG. 2. For example, FIG. 4A is a diagram of an example call flow 400 for an originating user device (e.g., user device 205-1) to send a message to a destination user device (e.g., user device 205-L) and/or an application function (e.g., AF 250). As another example, FIG. 4B is a diagram of an example call flow 450 for an application function (e.g., AF 250) to send a message to a destination user device (e.g., user device 205-1).

As shown in FIG. 4A and by reference number 402, a user device 205-1 may send a registration message to a unified data management (UDM) 220 to provide information concerning user device 205-1, such as at least one communication capability of user device 205-1. As shown by reference number 404, user device 205-1 may decide to send a message in a similar manner as described herein in relation to FIG. 1B. As shown by reference number 406, user device 205-1 may send a message service request to a network exposure function (NEF) 225 via an access and mobility management function (AMF) 215-1. NEF 225 may determine that NEF 225 is capable of receiving and/or transmitting a message from user device 205-1 and may grant the message service request.

As shown by reference number 408, user device 205-1 may send the message to NEF 225 in a similar manner as described herein in relation to FIG. 1B. As shown by reference number 410, NEF 225 may determine whether the message is intended for a user device 205-L and/or AF 250 in a similar manner as described herein in relation to FIG. 1B. As shown by reference number 412, where NEF 225 determined that the message is intended for user device 205-L, NEF 225 may determine a reachability of user device 205-L in a similar manner as described herein in relation to FIG. 1B. As shown by reference number 414, NEF 225 may send the message to user device 205-L and/or AF 250 in a similar manner as described herein in relation to FIG. 1B. As shown by reference number 416 user device 205-L and/or AF 250 may send a response message to NEF 225 in a similar manner as described herein in relation to FIGS. 1B and 1E. As shown by reference number 418, NEF 225 may send a notification message to user device 205-1 in a similar manner as described herein relation to FIGS. 1B and 1E.

As shown in FIG. 4B and by reference number 452, user device 205-1 may send a registration message to UDM 220 to provide information concerning user device 205-1 in a similar manner as described herein in relation to FIG. 4A. As shown by reference number 454, NEF 225 may communicate with AMF 215-1 to determine a reachability of user device 205-1 in a similar manner as described herein in relation to FIGS. 1B and 1C. As shown by reference number 456, AF 250 may send a message to NEF 225 in a similar manner as described herein in relation to FIG. 1C. As shown by reference number 458, NEF 225 may communicate with UDM 220 to determine a communication capability of user device 205-1 in a similar manner as described herein in relation to FIG. 1C. As shown by reference number 460, NEF 225 may process the message and determine to send the message to user device 205-1 via AMF 215-1 in a similar manner as described herein in relation to FIG. 1C.

As shown by reference number 462, NEF 225 may send a paging request to user device 205-1 and receive a paging response from user device 205-1 in a similar manner as described herein in relation to FIG. 1C. As shown by reference number 464, NEF 225 may send the message to user device 205-1 in a similar manner as described herein in relation to FIG. 1D. As shown by reference number 466, NEF 225 may receive a response message from user device 205-1 in a similar manner as described herein in relation to FIG. 1D. As shown by reference number 468, NEF 225 may send, based on the response message, an update message to AF 250 in a similar manner as described herein in relation to FIG. 1D. As shown by reference number 470, NEF 225 may receive a delivery message from user device 205-1 in a similar manner as described herein in relation to FIG. 1E. As shown by reference number 472, NEF 225 may send, based on the delivery message, a notification message to AF 250 in a similar manner as described herein in relation to FIG. 1E.

As indicated above, FIGS. 4A-4B are provided merely as examples. Other examples can differ from what was described with regard to FIGS. 4A-4B.

FIG. 5 is a flow chart of an example process 500 for a method and device for communicating messages via a 5G network. In some implementations, one or more process blocks of FIG. 5 may be performed by a device, such as a network exposure function (e.g., NEF 225), and/or one or more components of the device, such as a service based interface (SBI) adaptor (e.g., SBI adaptor 230), a short message service (SMS) adaptor (e.g., SMS adaptor 235), an application function message handler (e.g., AF message handler 240), and/or a routing data structure (e.g., routing data structure 245). In some implementations, one or more process blocks of FIG. 5 may be performed by another device or a group of devices separate from or including the network exposure device, such as a user device (e.g., user device 205), a base station (e.g., base station 210), a network device, such as an access and mobility management function (e.g., AMF 215), a unified data management (e.g., UDM 220), and/or an application function (e.g., AF 240).

As shown in FIG. 5, process 500 may include obtaining a list of a plurality of user devices from a first network device (e.g., an access and mobility management function device (AMF)), wherein the list of the plurality of user devices indicates a respective reachability of at least one user device of the plurality of user devices (block 505). For example, the network exposure device (e.g., using processor 320, memory 330, storage component 340, input component 350, communication interface 370, and/or the like) may obtain a list of a plurality of user devices from a first network device (e.g., an AMF), as described above. In some implementations, the list of the plurality of user devices indicates a respective reachability of at least one user device of the plurality of user devices.

As further shown in FIG. 5, process 500 may include receiving a first message intended for a first destination user device from the first network device (block 510). For example, the network exposure device (e.g., using processor 320, memory 330, storage component 340, input component 350, communication interface 370, and/or the like) may receive a first message intended for a first destination user device from the first network device, as described above. In some implementations, the first message is an SMS transfer protocol data unit (TPDU) message, a representational state transfer (REST) application programming interface (API) message that may include an SMS TPDU message, and/or the like. Additionally, or alternatively, the first message may not conform to an SMS format.

As further shown in FIG. 5, process 500 may include sending the first message to the first network device to cause the first network device to send the first message to the first destination user device (block 515). For example, the network exposure device (e.g., using processor 320, memory 330, storage component 340, output component 360, communication interface 370, and/or the like) may send the first message to the first network device to cause the first network device to send the first message to the first destination user device, as described above. In some implementations, the network exposure device may convert the first message into a T8 message, a REST API message, an optimized REST API message, and/or the like before sending the first message to the first network device.

As further shown in FIG. 5, process 500 may include receiving a second message intended for a second destination user device from a second network device (e.g., an application function device (AF)) (block 520). For example, the network exposure device (e.g., using processor 320, memory 330, storage component 340, input component 350, communication interface 370, and/or the like) may receive a second message intended for a second destination user device from a second network device (e.g., an AF), as described above. In some implementations, the NEF and the AF may communicate via a SBI, a REST API, a T8 interface, and/or the like. For example, the network exposure device may receive the second message from the second network device via a REST API between the network exposure device and the second network device.

In some implementations, the second message may conform to a first format, such as a T8 format, a REST API message format, and/or the like. Additionally, or alternatively, the second message may not conform to a particular format, such as an SMS format.

As further shown in FIG. 5, process 500 may include obtaining, from a third network device (e.g., a unified data management device (UDM)), information indicating at least one communication capability of the second destination user device (block 525). For example, the network exposure device (e.g., using processor 320, memory 330, storage component 340, input component 350, communication interface 370, and/or the like) may obtain, from a third network device (e.g., a UDM), information indicating at least one communication capability of the second destination user device, as described above.

In some implementations, the information indicating the at least one communication capability of the second destination user device includes information indicating that the second destination user device is capable of receiving messages that conform to a second format, such as an SMS format. When obtaining the information indicating the at least one communication capability of the second destination user device, the network exposure device may send a query to the third network device concerning a messaging capability of the second destination user device and receive, after sending the query, a response indicating that second the destination user device is capable of receiving messages that conform to the second format.

In some implementations, the network exposure device may convert the message from the first format to the second format based on the information indicating that the second destination user device is capable of receiving messages that conform to the second format. For example, the network exposure device may process the second message to cause the second message to conform to the SMS format, such as convert the second message into an SMS TPDU message. In another example, the network exposure device may add the second message to a payload of a REST API message.

As further shown in FIG. 5, process 500 may include determining, based on the list of the plurality of user devices, a reachability of the second destination user device (block 530). For example, the network exposure device (e.g., using processor 320, memory 330, storage component 340, communication interface 370, and/or the like) may determine, based on the list of the plurality of user devices, a reachability of the second destination user device, as described above.

In some implementations, the reachability of the second destination user device may indicate at least one time of reachability, a reachability status, a reachability start time, a reachability end time, and/or the like. In some implementations, the network exposure device may search for an entry concerning the second destination user device in the list of the plurality of user devices and obtain information concerning the reachability of the second destination user device.

In some implementations, the network exposure device may determine at least one time of reachability of the second destination user device based on the reachability of the second destination user device and determine that the second destination user device is not reachable. The network exposure device may send the second message to a data structure for storage. The network exposure device may then determine, based on the at least one time of reachability, that the second destination user device is reachable and obtain the second message from the data structure.

As further shown in FIG. 5, process 500 may include sending, based on the at least one communication capability of the second destination user device and/or the reachability of the second destination user device, the second message to the second destination user device via the first network device (block 535). For example, the network exposure device (e.g., using processor 320, memory 330, storage component 340, output component 360, communication interface 370, and/or the like) may send, based on the at least one communication capability of the second destination user device and/or the reachability of the second destination user device, the second message to the second destination user device via the first network device, as described above. In some implementations, the network exposure device may send the second message after converting the message to the second format. In some implementations, the network exposure device may send a REST API message, an SMS message, and/or the like that includes the second message to the first network device.

In some implementations, prior to sending the second message and based on the reachability of the second destination user device, the network exposure device may send a paging request to the first network device that indicates that the network exposure device will send the second message to the second destination user device. Accordingly, the network exposure device may receive after sending the paging request to the first network device, a paging response from the first network device that indicates that the second destination user device is ready to receive the second message.

In some implementations, the network exposure device may receive, from the first network device, after sending the second message to the second destination user device via the first network device, a response message indicating that the second destination user device received the second message. Based on the response message, the network exposure device may send an update message to the second network device indicating that the second destination user device received the second message.

As further shown in FIG. 5, process 500 may include receiving, from the first network device, a delivery message indicating that the second destination user device successfully received and/or decoded the second message (block 540). For example, the network exposure device (e.g., using processor 320, memory 330, storage component 340, input component 350, communication interface 370, and/or the like) may receive, from the first network device, a delivery message indicating that the second destination user device successfully received and/or decoded the second message, as described above.

As further shown in FIG. 5, process 500 may include sending, to the second network device, a notification message indicating that the second destination user device successfully received and/or decoded the second message (block 545). For example, the network exposure device (e.g., using processor 320, memory 330, storage component 340, output component 360, communication interface 370, and/or the like) may send, to the second network device, a notification message indicating that the second destination user device successfully received and/or decoded the second message, as described above. In some implementations, the network exposure device may send the notification message to the second network device via the REST API between the device and the second network device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, may be implemented in different forms of hardware, firmware, and/or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method comprising:
converting, by one or more devices, a message from a first format to a second format before sending the message to a destination user device;
sending, by the one or more devices, the message to the destination user device via a particular device;
receiving, by the one or more devices and from the particular device, a response message, indicating that the destination user device received the message, after sending the message to the destination user device and before receiving a delivery message from the destination user device,
wherein the response message and the delivery message are sent due to the sending of the message;
sending, by the one or more devices and based on the response message, an update message, indicating that the destination user device received the message; and
receiving, by the one or more devices, the delivery message after sending the update message,
wherein the delivery message indicates that the destination user device received and decoded the message.

2. The method of claim 1, wherein the particular device is an access and mobility management function device.

3. The method of claim 1, wherein the one or more devices include a network exposure function device (NEF).

4. The method of claim 1, wherein the message is converted based on information indicating that the destination user device is capable of receiving messages that conform to the second format.

5. The method of claim 1, wherein the update message is sent to an application network device.

6. The method of claim 1, further comprising:
sending, to an application network device, after sending the update message, and after receiving the delivery message, a notification message indicating that the destination user device successfully received and decoded the message.

7. The method of claim 1, further comprising:
determining, based on a list of a plurality of user devices, a reachability of the destination user device,
wherein the message is sent to the destination user device based on the reachability of the destination user device.

8. A system, comprising:
one or more memories; and
one or more processors communicatively coupled to the one or more memories, configured to:
convert a message from a first format to a second format before sending the message to a destination user device;
send the message to the destination user device via a particular device;
receive, from the particular device, a response message, indicating that the destination user device received the message, after sending the message to the destination user device and before receiving a delivery message from the destination user device,
wherein the response message and the delivery message are sent due to the sending of the message;
send, based on the response message, an update message indicating that the destination user device received the message; and
receive the delivery message after sending the update message,
wherein the delivery message indicates that the destination user device received and decoded the message.

9. The system of claim 8, wherein the message is converted based on information indicating that the destination user device is capable of receiving messages that conform to the second format.

10. The system of claim 8, wherein the one or more processors are further configured to:
send, to an application network device and after sending the update message, a notification message indicating that the destination user device successfully received and decoded the message.

11. The system of claim 8, wherein the one or more processors are further configured to:
determine, based on a list of a plurality of user devices, a reachability of the destination user device,
wherein the message is sent to the destination user device based on the reachability of the destination user device.

12. A non-transitory computer-readable medium storing instructions, the instructions comprising:
one or more instructions that, when executed by one or more processors, cause the one or more processors to:
convert a message from a first format to a second format before sending the message to a destination user device;
send the message to the destination user device via a particular device;
receive, from the particular device, a response message, indicating that the destination user device received the message, after sending the message to the destination user device and before receiving a delivery message from the destination user device,
wherein the response message and the delivery message are sent due to the sending of the message;
send, based on the response message, an update message indicating that the destination user device received the message; and
receive the delivery message after sending the update message,
wherein the delivery message indicates that the destination user device received and decoded the message.

13. The non-transitory computer-readable medium of claim 12, wherein the message is converted based on information indicating that the destination user device is capable of receiving messages that conform to the second format.

14. The non-transitory computer-readable medium of claim 12, wherein the one or more instructions, when executed by the one or more processors, further cause the one or more processors to:
send, to an application network device and after sending the update message, a notification message indicating that the destination user device successfully received and decoded the message.

15. The non-transitory computer-readable medium of claim 12, wherein the particular device is an access and mobility management function device.

16. The non-transitory computer-readable medium of claim 12, wherein the one or more instructions, when executed by the one or more processors, further cause the one or more processors to:
- determine, based on a list of a plurality of user devices, a reachability of the destination user device,
  - wherein the message is sent to the destination user device based on the reachability of the destination user device.

17. The non-transitory computer-readable medium of claim 12, wherein the update message is sent to an application network device.

18. The system of claim 8, wherein the particular device is an access and mobility management function device.

19. The system of claim 8,
- wherein the system includes a network exposure function device (NEF), and
- wherein the NEF includes the one or more memories and the one or more processors.

20. The system of claim 8, wherein the update message is sent to an application network device.

\* \* \* \* \*